May 1, 1928. 1,667,933

F. A. HAMEL

BRAKE FOR CHILDREN'S AUTOMOBILES

Filed Nov. 8, 1926

INVENTOR.
FREDERICK A. HAMEL
BY Whittemore Hulbert
Whittemore & Belknap
ATTORNEYS Patented May 1, 1928.

1,667,933

UNITED STATES PATENT OFFICE.

FREDERICK A. HAMEL, OF TOLEDO, OHIO, ASSIGNOR TO THE GENDRON WHEEL COMPANY, OF TOLEDO, OHIO, A CORPORATION OF OHIO.

BRAKE FOR CHILDREN'S AUTOMOBILES.

Application filed November 8, 1926. Serial No. 147,067.

The invention relates to brake mechanism for children's vehicles and more particularly to a construction adapted for toy automobiles.

One of the objects of the invention is to provide a brake for toy automobiles which simulates an emergency brake on real automobile vehicles, but which can be released more readily than the real emergency brakes.

Another object is to provide a brake mechanism suitable for children's vehicles in which the brake is automatically held in its set position but which can be manually released by merely applying pressure to the controlling lever without independently operating the catch which normally maintains the mechanism in adjusted position.

A further object is to secure a mechanism of simple construction which can be manufactured and installed at a relatively low cost.

Figure 1:
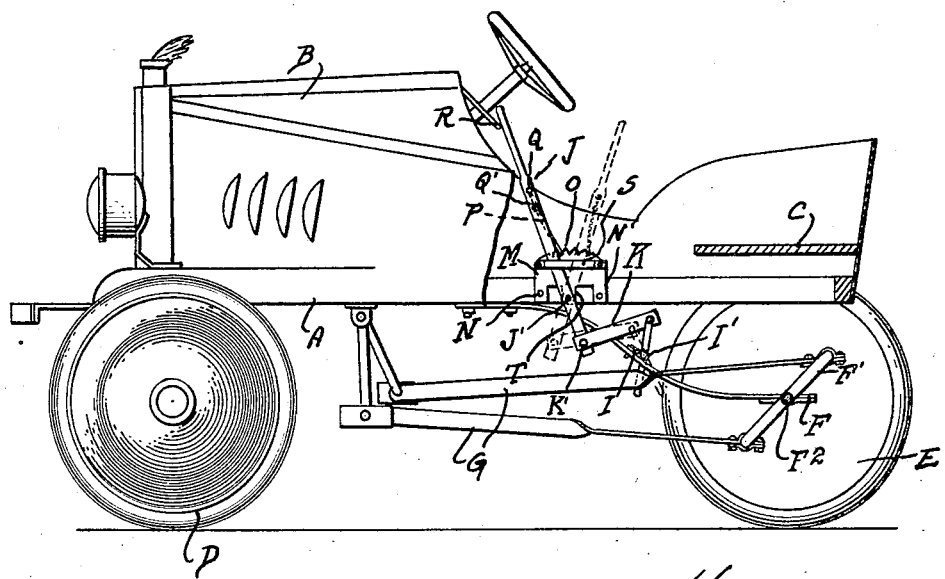
Figure 2:
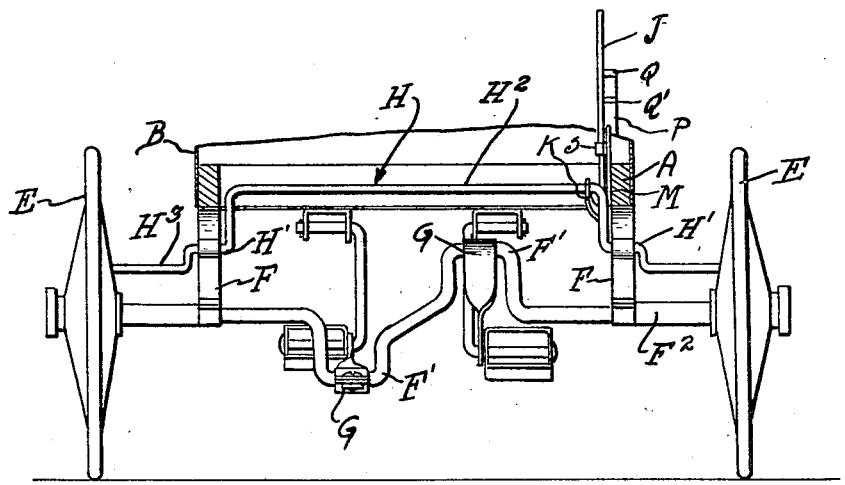

These and other objects are attained by providing the novel construction hereinafter described and illustrated in the accompanying drawings, wherein Figure 1 is a side view of a toy automobile equipped with the novel brake mechanism;

Figure 2 is a view of the brake mechanism looking from the rear of the vehicle.

While my invention may advantageously be applied to various types of children's vehicles, the embodiment which is herein illustrated is mounted on a toy automobile comprising a frame A carrying the body B and seat C and mounted on the front steering wheels D and the rear non-steering wheels E. F represents the rear cantilever springs attached to the frame A and extending downwardly to the rear axle F which is positively connected to one of the rear wheels. The rear axle is provided with the cranks F' to which are connected the propelling mechanism herein shown as the pedal-actuated levers G.

The brake mechanism comprises a brake member H having the aligned bearing portions H', the intermediate U-shaped connecting portion $H^2$, which is laterally offset from the bearing portions H', and the outer crank portions $H^3$, the latter being also offset and extending outwardly into proximity to the periphery of the rear wheels.

The brake member is preferably formed by bending a rod into the form above described and as shown all of the rod portions lie in a common plane. The bearing portions H' are rotatably mounted between the springs F and the brackets I secured to said springs and provided with the rounded portions I' for retaining the brake member in position. For actuating the brake member there is a lever J fulcrumed at J' and connected to the brake member by a link K having one end apertured to engage the offset portion $H^2$ and the other end pivotally connected to the lever at K'. The lever J is fulcrumed on a bracket M, which in turn is secured to the frame A by suitable retaining means N extending through the apertured ears N'. The bracket M has a segmental upper surface provided with a series of teeth O which serve to engage the free end of a spring detent P carried by the lever J. The detent is preferably in the form of a flat spring, the upper end of which is bent around a pin Q and is anchored to the lever by the U-shaped staple Q', the legs of which extend on opposite sides of the spring through the lever and are riveted thereto. The upper end of the lever is formed into a handle R which extends above the body of the automobile in a position where it may readily be grasped by the occupant of the vehicle. S is a guard member attached to the bracket M and arranged on the opposite side of the lever from said bracket. T is an apertured ear arranged below the toothed portion of the bracket for receiving the fulcrum J' of the lever.

With the construction as described the brake is in its released position when the lever J is in its forward position. The brake is set by moving the lever rearwardly, causing the spring detent P to ride over the teeth O and engage behind the same. The detent is sufficiently flexible to permit this ratchet movement, but, on the other hand, it is of sufficient tension to maintain the lever in any position of adjustment. This is due partly to the leverages employed in the mechanism, since the distance between the fulcrum J' and the staple Q' is much greater than between the fulcrum J' and the link K. Similarly the throw of the portion $H^2$ is greater than the crank arm $H^3$. Thus a slight resilient force in the spring detent P is sufficient to maintain the cranks $H^3$ in engagement with the wheels. On the other hand, the brake may be manually released by applying only a slight pressure to the handle Q, due to the longer leverage effective at this point.

What I claim as my invention is:

1. A brake mechanism for a child's vehicle comprising a brake shoe engageable with a wheel of the vehicle, a fulcrumed actuating lever connected to said brake shoe, and stops arranged about said fulcrum, a flexible member carried by said lever and engageable with said stops to non-positively holding said lever in adjusted position.

2. A brake mechanism for a child's vehicle comprising a brake shoe engageable with a wheel of the vehicle, a fulcrumed actuating lever connected to said brake shoe, a series of fixed stops arranged concentrically of said fulcrum, and a laterally flexible spring detent carried by said lever and engageable with said stops to non-positively hold said brake shoe in adjusted position.

3. A brake mechanism for a child's vehicle comprising a brake shoe engageable with a wheel of the vehicle, a fulcrumed actuating lever connected to said brake shoe, a series of teeth arranged concentrically of said fulcrum, and a spring detent having one end secured to said lever and the other engaging said teeth, said spring detent being sufficiently flexible to ride over said teeth when pressure is applied to said lever and being of sufficient tension to hold said brake shoe in adjusted position.

4. A brake mechanism for a child's vehicle comprising a brake shoe engageable with a wheel of the vehicle, a fulcrumed lever having a handle at one end thereof, a series of teeth arranged concentrically of the fulcrum of said lever, a spring detent having one end fixedly secured to said lever intermediate said handle and fulcrum and having the other end extending into engagement with said teeth, a crank arm connected to said brake shoe, and a link between said crank arm and said lever.

5. A brake mechanism for a child's vehicle comprising a brake member having aligned bearing portions, an intermediate connecting portion offset from said bearing portions, and outer crank arms adapted to engage the periphery of the vehicle wheels, bearings for said brake member, a bracket having a toothed segment, a lever fulcrumed on said bracket concentrically of said toothed segment, a link connecting said lever with the intermediate portion of said brake member, a handle at the outer end of said lever, and a spring detent fixedly secured at one end to said lever and provided with a freely flexible opposite end engaging said toothed segment.

6. In a toy automobile, the combination with a frame, cantilever springs secured to said frame, a rear axle carried by said springs, and wheels mounted on said rear axle, of a brake member having aligned bearing portions rotatably mounted on said springs, crank arms extending outwardly from said bearing portions adjacent the periphery of said wheels, a connecting portion intermediate said bearing portions and offset with respect thereto, a bracket secured to said frame and provided with a series of teeth arranged in a circular path, an actuating lever fulcrumed upon said bracket concentrically with said teeth, a link connecting said lever and intermediate offset portion, and a flat spring detent having one end fixedly secured to said actuating lever, the other end of said detent being free to flex in the direction of movement of said lever and being extended into engagement with said teeth.

In testimony whereof I affix my signature.

FREDERICK A. HAMEL.